United States Patent
Matsunaga

(10) Patent No.: US 7,393,490 B2
(45) Date of Patent: Jul. 1, 2008

(54) MOLDING METHOD FOR VEHICULAR LAMP PART AND MOLDING APPARATUS FOR VEHICULAR LAMP PART

(75) Inventor: Takahisa Matsunaga, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 309 days.

(21) Appl. No.: 11/236,508

(22) Filed: Sep. 28, 2005

(65) Prior Publication Data
US 2006/0066009 A1    Mar. 30, 2006

(30) Foreign Application Priority Data
Sep. 28, 2004    (JP)    ............ P.2004-281312

(51) Int. Cl.
*B29C 45/44*    (2006.01)

(52) U.S. Cl. ............ 264/318; 264/334; 425/444; 425/577

(58) Field of Classification Search ............ 425/444, 425/577, DIG. 58; 264/318, 334
See application file for complete search history.

(56) References Cited

U.S. PATENT DOCUMENTS

| | | | | |
|---|---|---|---|---|
| 3,642,417 A | * | 2/1972 | Von Holdt | 425/443 |
| 5,766,655 A | * | 6/1998 | Tajiri et al. | 425/556 |
| 5,773,048 A | * | 6/1998 | Ramsey | 425/556 |
| 5,814,357 A | * | 9/1998 | Boskovic | 425/556 |
| 6,457,968 B1 | * | 10/2002 | Navarra Pruna | 425/556 |
| 6,749,420 B2 | * | 6/2004 | Navarra Pruna | 425/556 |
| 2002/0094356 A1 | * | 7/2002 | Navarra Pruna | 425/556 |

FOREIGN PATENT DOCUMENTS

| | | |
|---|---|---|
| JP | 57-6515 U | 1/1982 |
| JP | 59-29216 U | 2/1984 |
| JP | 05-58249 U | 8/1993 |
| JP | 07-246641 A | 9/1995 |
| JP | 09-155930 A | 6/1997 |

* cited by examiner

*Primary Examiner*—Robert B. Davis
*Assistant Examiner*—Emmanuel S Luk
(74) *Attorney, Agent, or Firm*—Sughrue Mion, PLLC

(57) ABSTRACT

A molding method and apparatus includes movable die 30 and fixed die 20 which form cavity 50, and extrusion plate 40 movable in the die closing/opening direction. A die surface 32b corresponding to the undercut portion is formed by separate push-up block 32, which is fixed to push-up pin 42, which is tiltably held by extrusion plate 40, and passes through insertion hole 34 in movable die 30. A gap 34a enables push-up pin 42 to tilt in the insertion hole. Push-up block 32 releases the part from the movable die by relative movement between extrusion plate 40 and movable die 30, and, by further movement of the part, the slanted surface of the undercut portion pushes the die surface of the push-up block in a direction which intersects with the die closing/opening direction to free the undercut portion by tilting the push-up pin and push-up block.

10 Claims, 7 Drawing Sheets

MOLDING METHOD FOR VEHICULAR LAMP PART AND MOLDING APPARATUS FOR VEHICULAR LAMP PART

CROSS-REFERENCE TO RELATED APPLICATION

This application is based upon and claims the benefit of priority from Japanese Patent Application No. 2004-281312, filed on Sep. 28, 2004, in the Japanese Patent Office, the disclosure of which is incorporated herein in its entirety by reference.

BACKGROUND OF THE INVENTION

1. Field of the Invention

The invention relates to a molding method and apparatus for a vehicular lamp part. More specifically, the invention relates to a molding method and apparatus for molding a vehicular lamp part having an undercut portion without making a die complex.

2. Description of Related Art

In a vehicular lamp part, there are cases in which forming an undercut portion is unavoidable.

For example, when a light source bulb 3 is attached to the center of a rear portion of a lamp body 2, as in a vehicular lamp 1 shown in FIG. 5, a waterproofing rib 4 protrudes toward the rear so as to surround a portion of the light source bulb 3 (or a socket holding the light source bulb 3) that protrudes from the rear surface of a lamp body 2. The rear end of this waterproofing rib 4 is abutted against a vehicle body (not shown) via a seal member 5, to make the area around the light source bulb 3 watertight.

When this type of waterproofing rib 4 is formed, the protruding length is quite large. As a result, if the waterproofing rib 4 is formed with an equal thickness from the front end (the end adjacent to the lamp body 2) to the rear end, it is not possible to release it from the die during injection molding. Therefore, the waterproofing rib 4 is formed with tapered surfaces 4a, 4a, referred to as so-called draft angles (see FIG. 6). When these kinds of tapered surfaces 4a, 4a are formed and a predetermined thickness is maintained at the rear end for strength, the thickness of a base portion 4b inevitably correspondingly increases. An increase in the thickness of the base portion 4b means an increase in mass of material resin around the base portion 4b, which results in a large difference in cooling speed, after injection, between the surface and the inner portion. This difference causes a depression 6, referred to as a so-called sinking, and therefore compromises the appearance. With a lamp body of a vehicular lamp, reflective surface treatment by vapor deposition or painting or the like is often applied to the inside surface, so even a slight deformation of the surface is highly visible.

Therefore, as shown in FIG. 7, a tapered surface 4'a is formed on one side of a waterproofing rib 4' and an undercut portion 4'c is formed on the other side. Undercut portion 4'c has a slanted surface which is slanted with respect to a die closing/opening direction, i.e., the moving direction of a movable die when the die is closed and a cavity is formed, and the moving direction of the movable die when the die is opened and the cavity is opened. Thus, the thickness of the base portion 4'a of the waterproofing rib 4' is not made too thick and, as a result, the sinking 6 described above can be inhibited from occurring.

However, when a molded part has an undercut portion, the undercut portion is not able to be released from the die by simply moving the die in the die opening direction. Therefore, a portion of the movable die, i.e., a die surface which corresponds to the undercut portion, is constructed of a sliding core that moves in a direction that intersects with the die closing/opening direction with respect to the movable die. That is, after injection molding, the sliding core is first moved and separated from the undercut portion, and then the die is opened.

Providing the sliding core, however, is problematic in that it leads to an increase in the cost of the die due to the complexity of the movable die. Thus, methods have been developed to enable a molded part that has an undercut portion to be released from a die without using a sliding core so that the cost of the die does not increase remarkably, such as shown in: (1) Japanese Utility Model Publication Sho. 57-6515; (2) Japanese Utility Model Publication Sho. 59-29216; (3) Japanese Utility Model Publication Hei. 5-58249; and (4) Japanese Patent Application Laid-Open Publication No. Hei. 9-155930.

However, these methods still fail to provide a die construction and operation that are sufficiently simple and have sufficient cost reduction.

Therefore, in view of the foregoing problems, it is an object of the invention to mold a vehicular lamp part having an undercut portion without making the die complex.

BRIEF SUMMARY OF THE INVENTION

In a first aspect of the invention a molding method for molding a vehicular lamp part having an undercut portion that has a surface that slants with respect to a die closing/opening direction of a movable die, includes: molding the vehicular lamp part in a molding apparatus including a fixed die which closes together with the movable die to define a cavity an extrusion plate positioned on a first side of the fixed die, with the movable die disposed therebetween, and which is movable in the die closing/opening direction, a separate push-up block, forming a portion of the cavity defined by the movable die corresponding to the undercut portion, a push-up pin comprising a first end fixed to the push-up block, a second end turnably held by the extrusion plate, and a middle part inserted into an insertion hole formed in the movable die, and the movable die comprising a gap formed between the insertion hole and the push-up pin that enables the push-up pin to tilt; releasing the vehicular lamp part from the movable die via the push-up block by relative movement between the extrusion plate and the movable die; and freeing the push-up block from the undercut portion by tilting the push-up pin with respect to the extrusion plate via further movement of the vehicular lamp part so that the slanted surface of the undercut portion pushes a die surface of the push-up block in a direction which intersects with the die closing/opening direction.

In another aspect of the invention, a molding apparatus for molding a vehicular lamp part having an undercut portion that has a surface that slants with respect to a die closing/opening direction of a movable die, includes a fixed die which closes together with the movable die to define a cavity, an extrusion plate positioned on a first side of the fixed die, with the movable die disposed therebetween, and which is movable in the die closing/opening direction; a separate push-up block, forming a portion of the cavity defined by the movable die corresponding to the undercut portion; a push-up pin comprising a first end fixed to the push-up block, a second end turnably held by the extrusion plate, and a middle part inserted into an insertion hole formed in the movable die; and the movable die comprising a gap formed between the insertion hole and the push-up pin that enables the push-up pin to tilt. The movable die is movable in the die closing/opening direction, and the extrusion plate is movable in the die closing/opening direction relative to the movable die to release the vehicular lamp part from the movable die. The push-up pin is tilted, after the release of the vehicular lamp part from the movable die and its corresponding movement further in the release direction, when the slanted surface of the undercut portion pushes the die surface of the push-up block in a direction that intersects with the die closing/opening direction, thereby freeing the push-up block from the undercut portion.

According to another aspect, the invention includes a molding method, including: molding a component in a molding cavity defined by a fixed die, a movable die, and a push-up block, the component comprising an undercut portion at least partially defined by the push-up block to have a surface that slants with respect to a die opening/closing direction; opening the molding cavity by moving the movable die in the die opening/closing direction; moving an extrusion plate relative to the movable die so that a push-up pin, movably mounted on the extrusion plate and fixed to the push-up block, separates the push-up block from the movable die, thereby separating the component from the movable die; and tilting the push-up pin relative to the die opening/closing direction to separate the push-up block from the component.

According to another aspect, the invention includes a molding apparatus, including: a fixed die, a movable die, and a push-up block defining a molding cavity to form a component, the component comprising an undercut portion at least partially defined by the push-up block to have a surface that slants with respect to a die opening/closing direction; an extrusion plate, movable with respect to the movable die in the die opening/closing direction; a push-up pin movably mounted on the extrusion plate and fixed to the push-up block, the movable die having an insertion hole through which the push-up pin extends, the insertion hole having a diameter larger than the push-up pin to allow the push-up to tilt so that the component can be separated from the push-up block.

Accordingly, in the invention, the push-up block which has the die surface corresponding to the undercut portion is pushed by the slanted surface of the undercut portion by the movement of the vehicular lamp part and moved in a direction that frees it from the undercut portion. As a result, there is no need to provide a mechanism on the movable die for moving the push-up block in a direction that frees it from the undercut portion, thereby enabling the die structure to be simplified.

In another aspect of the invention, a plurality of protruding pins are held by the extrusion plate, and at least one or more of these protruding pins has a two level extrusion construction, the vehicular lamp part is released together with the push-up block from the movable die by extrusion of the first level of the protruding pin, and the further movement of the vehicular lamp part occurs by extrusion of the second level of the protruding pin of the two level extrusion construction. As a result, the vehicular lamp part is reliably released by the two level extrusion of the protruding pin.

In another aspect of the invention, the molding apparatus further comprises a positioning block, fixed to the second end of the push-up pin, including contact surfaces continuously extending at angles on the top and bottom thereof. The push-up block is held in a die closed position by contact between a first surface of the contact surfaces and a restricting surface formed on the extrusion plate, and the push-up block is freed from the undercut portion via the movement of the first surface away from the restricting surface of the extrusion plate. Accordingly, nothing, such as a spring or an elastic member, forcibly abuts the die surface of the push-up block against the slanted surface of the undercut portion. Therefore, there is almost no resistance against the further movement of the vehicular lamp part, so when the push-up block is moved so as to be freed from the undercut portion by the slanted surface of the undercut portion, unreasonable force is not applied to the vehicular lamp part.

In other aspects of the invention, the tilting of the push-up pin is caused by pressure exerted on the push-up block by the undercut portion of the component in the direction of the tilting, the push-up pin is tiltably mounted on the extrusion plate via a positioning block provided within a concave portion of the extrusion plate, and the positioning block comprises an upper surface with at least two differently angled surfaces that individually interact with the concave portion to define the range of the tilting of the push-up pin.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Figure 1:
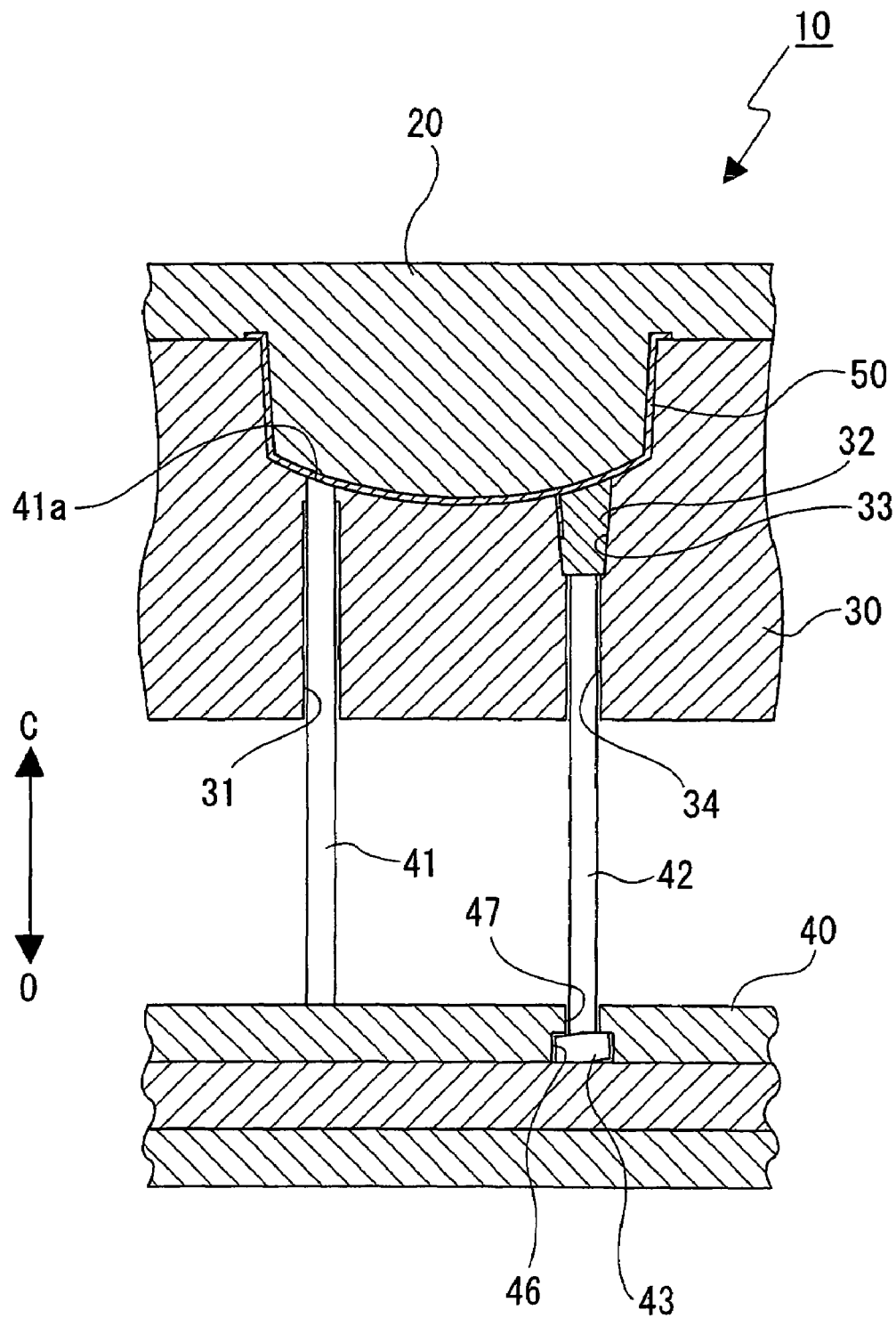
FIG. 1 shows a cross-sectional view of an exemplary embodiment of a die of the molding apparatus for a vehicular lamp part according to the invention, in a closed state.

Hereinafter, exemplary embodiments for implementing the molding method and apparatus for a vehicular lamp part according to the invention will be described with reference to accompanying drawings. The described exemplary embodiments are intended to assist the understanding of the invention, and are not intended to limit the scope of the invention in any way.

In the following description, a molding method and molding apparatus will be described which molds a lamp body 2' provided with a rib 4' having an undercut portion 4'c.

A molding apparatus 10 for a vehicular lamp part includes a fixed die 20, a movable die 30, and an extrusion plate 40. When the die is closed, a cavity 50 is formed between the movable die 30 and the fixed die 20. The extrusion plate 40 is positioned on one side of the fixed die 20 so that the movable die 30 is disposed therebetween. The extrusion plate 40 is constructed so that it can move in the die closing/opening direction (direction of arrows C-O) with respect to the movable die 30.

FIG. 1 shows the die in a closed state, with the cavity 50 formed between the fixed die 20 and the movable die 30.

The base end portion of a plurality of protruding pins 41, 41, . . . (only one is shown in the drawing) is supported by the extrusion plate 40. The middle portions of the protruding pins 41, 41, . . . are slidably inserted into insertion holes 31, 31, . . . formed in the movable die 30. When the die is closed (see FIG. 1), upper end surfaces 41a, 41a, . . . of the protruding pins 41, 41, . . . form surfaces that are continuous with a die surface 30a of the movable die 30 so as to form part of the die surface that forms the cavity 50.

Of the die surfaces of the movable die 30 that form the cavity 50, the portion corresponding to the undercut portion (slanted portion) 4'c of the waterproofing rib 4' is formed by part of a push-up block 32 provided in the movable die 30. The push-up block 32 is formed in the shape of a block that is long in the vertical direction (die closing/opening direction), and is constructed so as to fit within a placement concave portion 33 formed so as to be open at the upper surface of the movable die 30, i.e., at the surface opposing the fixed die 20. When fit in the placement concave portion 33, an upper surface 32a of the push-up block 32 forms a die surface that corresponds to a part of the rear surface of the lamp body 2'. Also, a gap 51 is formed between a part of the open end portion of the side surface of the placement concave portion 33 and a part 32b of the upper end portion of the side surface of the push-up block 32. That is, the gap 51 provides a cavity to form the waterproofing rib 4', and the part 32b of the outer surface of the push-up block 32 becomes the die surface that forms the undercut portion.

The push-up block 32 is connected to the extrusion plate 40 by a push-up pin 42. An insertion hole 34, the upper end of which is communicated with the lower end of the placement concave portion 33 and which is open at the lower end of the movable die 30, is formed in the movable die 30. The upper end of the push-up pin 42 is inserted into the insertion hole 34 and fixed to the lower end of the push-up block 32. The inside diameter of the insertion hole 34 is sufficiently larger than the outside diameter of the push-up pin 42, such that a gap 34a which enables the push-up pin 42 to tilt is formed between the push-up pin 42 and the insertion hole 34.

A positioning block 43 is fixed to the lower end of the push-up pin 42. Contact surfaces 44a, 45a and 44b, 45b are formed on both the upper and lower surfaces of the positioning block 43. The contact surfaces 44a and 45a oppose each other vertically and extend in parallel in a first direction, while the contact surfaces 44b and 45b oppose each other vertically and extend in parallel in a second direction. The angles between the contact surfaces 44a and 44b and between the contact surfaces 45a and 45b are the same. The positioning block 43 is arranged within a restricting concave portion 46 formed in the extrusion plate 40. The restricting concave portion 46 is open to the upper surface of the extrusion plate 40 via an insertion hole 47. The protruding pin 41 extends upward through this insertion hole 47. Both upper and lower surfaces 46a, 46b of the restricting concave portion 46 are restricting surfaces that are parallel with each other. When the die is closed as shown in FIG. 1, the contact surface 44a of the position block 43 abuts against the restricting surface 46a, and the contact surface 45a abuts against the restricting surface 46b.

Next, the operation of the foregoing molding apparatus 10 will be described.

Resin material that has been heated and melted is injected from an injection port (not shown) into the cavity 50 formed by the die being closed as shown in FIG. 1, so that a lamp body 2' which is a copy of the die surface of the cavity 50, is formed. After cooling the resin material that has been injected, the die is opened and the lamp body 2' is released from the die.

Figure 2:
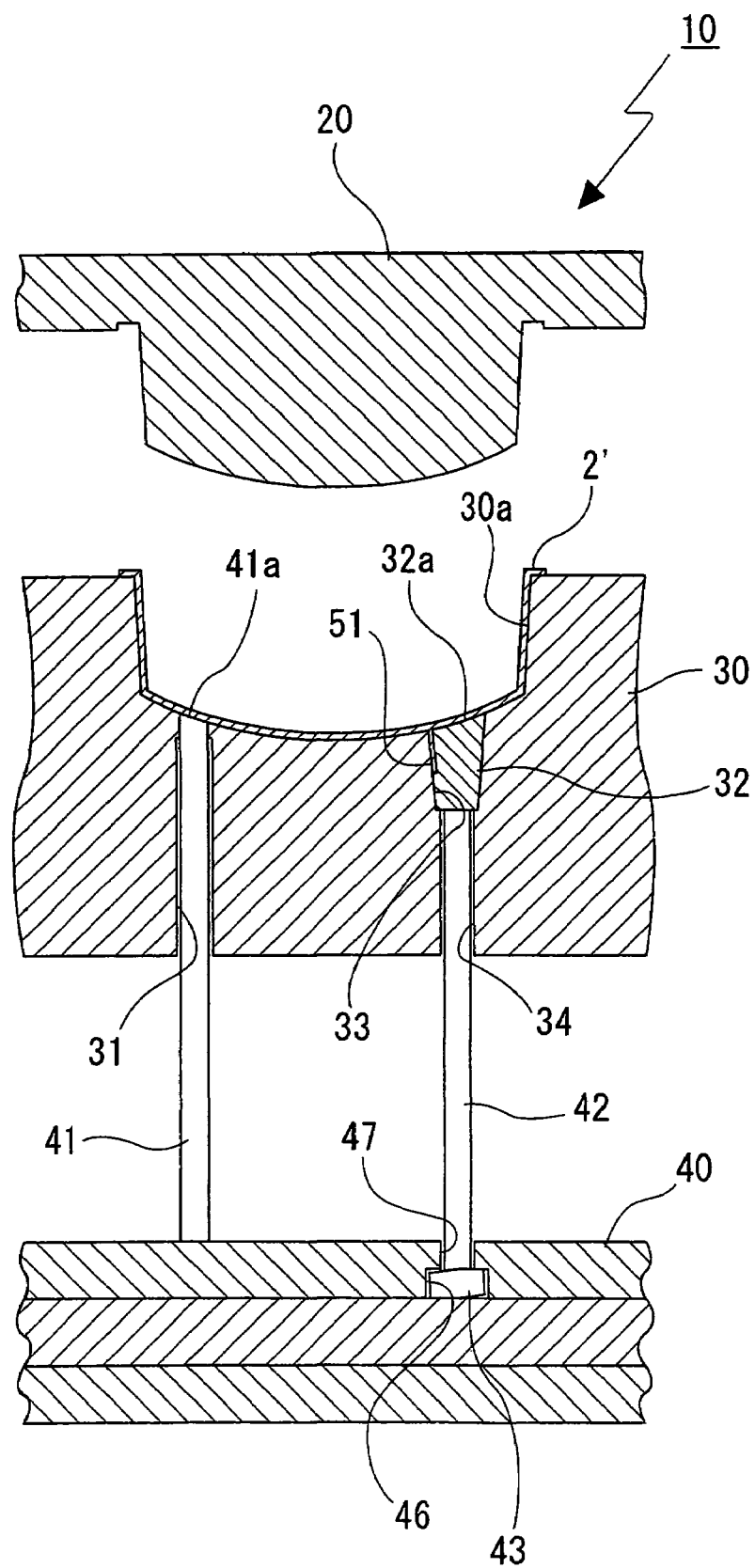
FIG. 2 is a cross-sectional view showing the die of FIG. 1 in an opened state and the vehicular lamp part released from a fixed die.

The die is opened by first moving the extrusion plate 40 and the movable die 30 in the die opening direction (the direction of arrow O in FIG. 1). The lamp body 2' is then released from the fixed die (see FIG. 2), and simultaneously with this, or following this, the extrusion plate 40 is moved in the die closing direction (the direction of arrow C in FIG. 1) with respect to the movable die 30. Accordingly, the protruding pins 41, 41, . . . and the push-up block 32 (together with the push-up pin 42) move in the die closing direction relative to the movable die 30. As a result, the lamp body 2' is released from the die surface 30a of the movable die 30, but the die surfaces 32a and 32b of the push-up block 32 are still stuck to the lamp body 2' (see FIG. 3).

Figure 3:
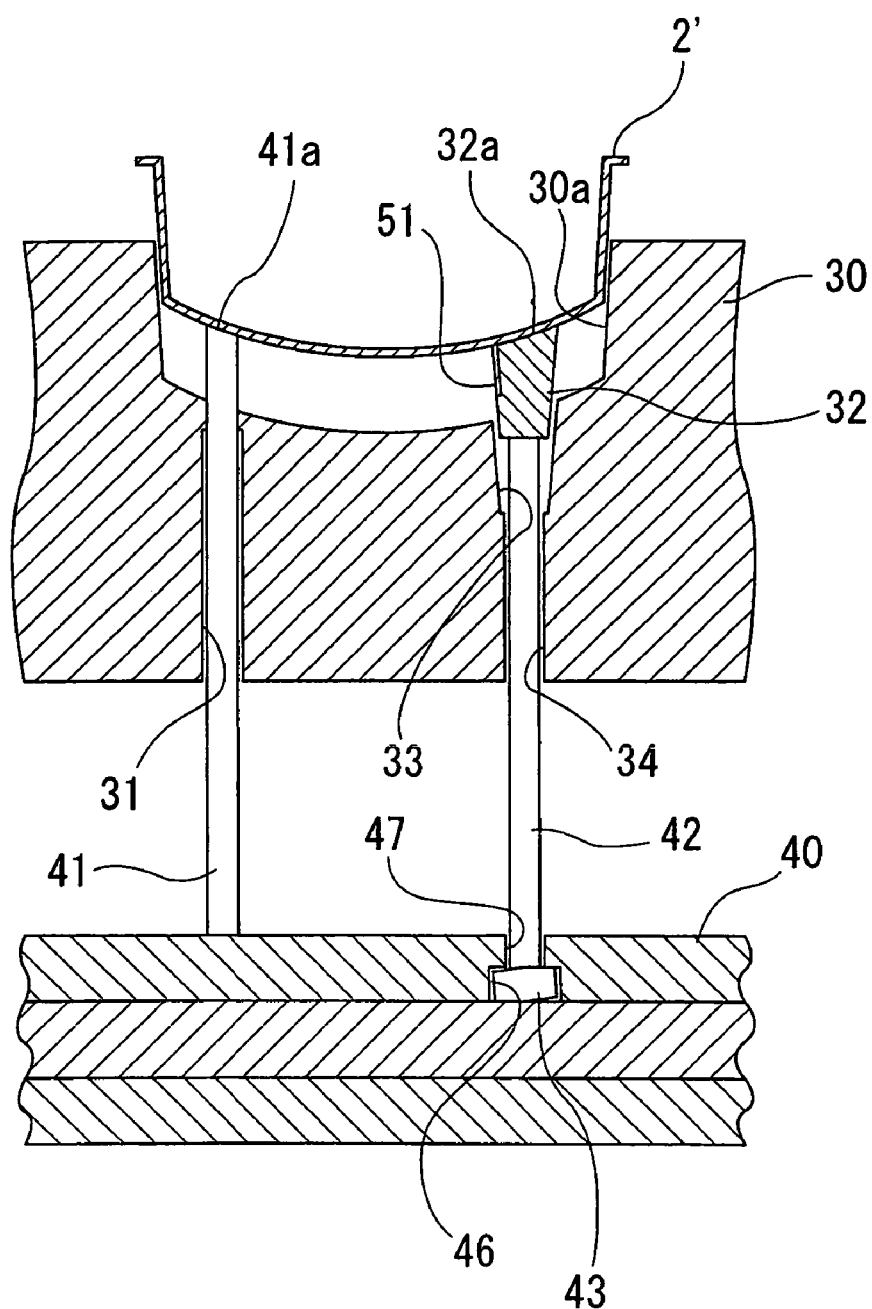
FIG. 3 is a cross-sectional view of the die of FIG. 1 showing the vehicular lamp part being released from a movable die by relative movement of an extrusion plate with respect to the movable die.
Figure 4:
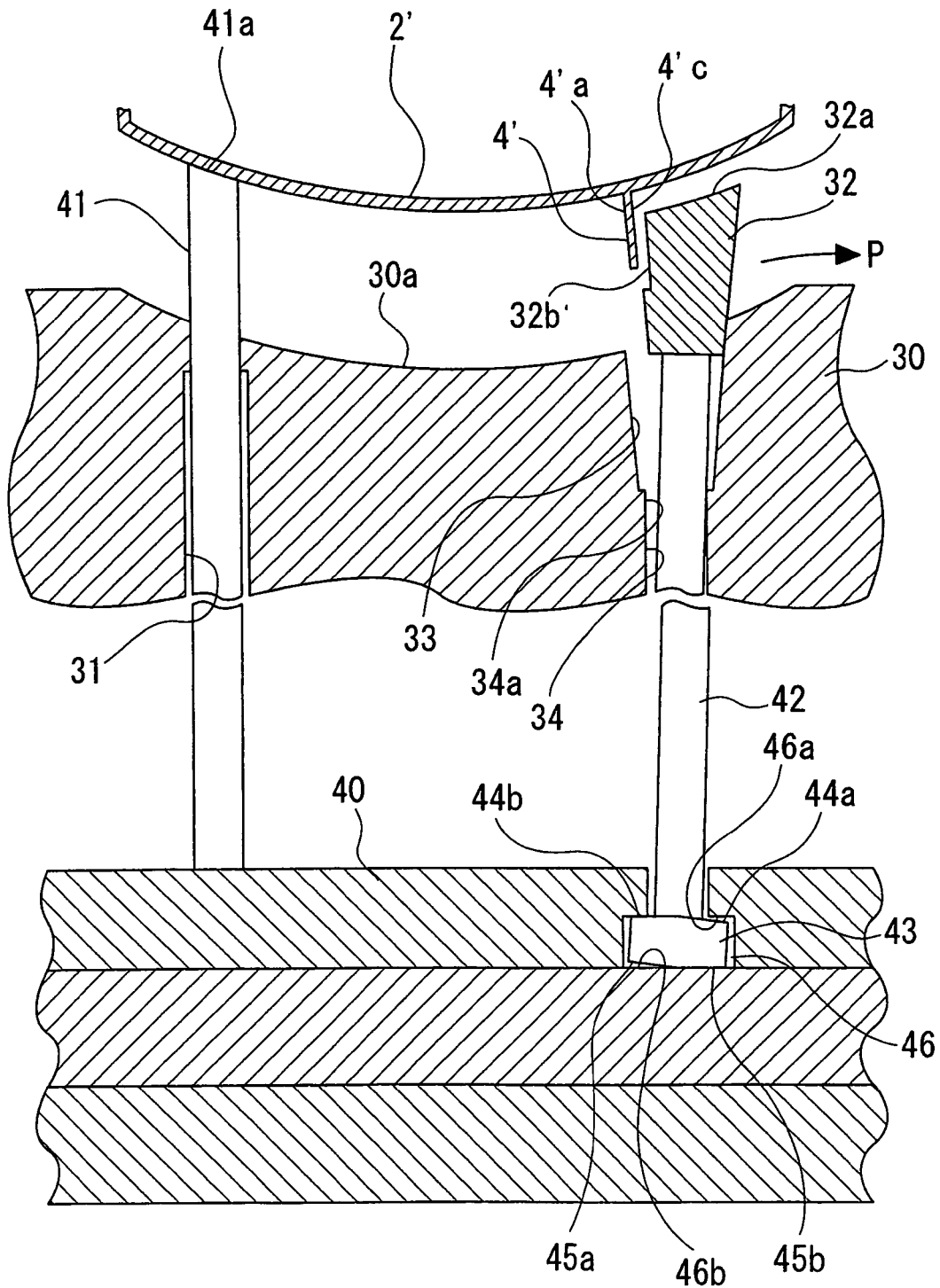
FIG. 4 is a more detailed cross-sectional view of the die of FIG. 1, showing the vehicular lamp part being even further separated from the movable die.
Figure 5:
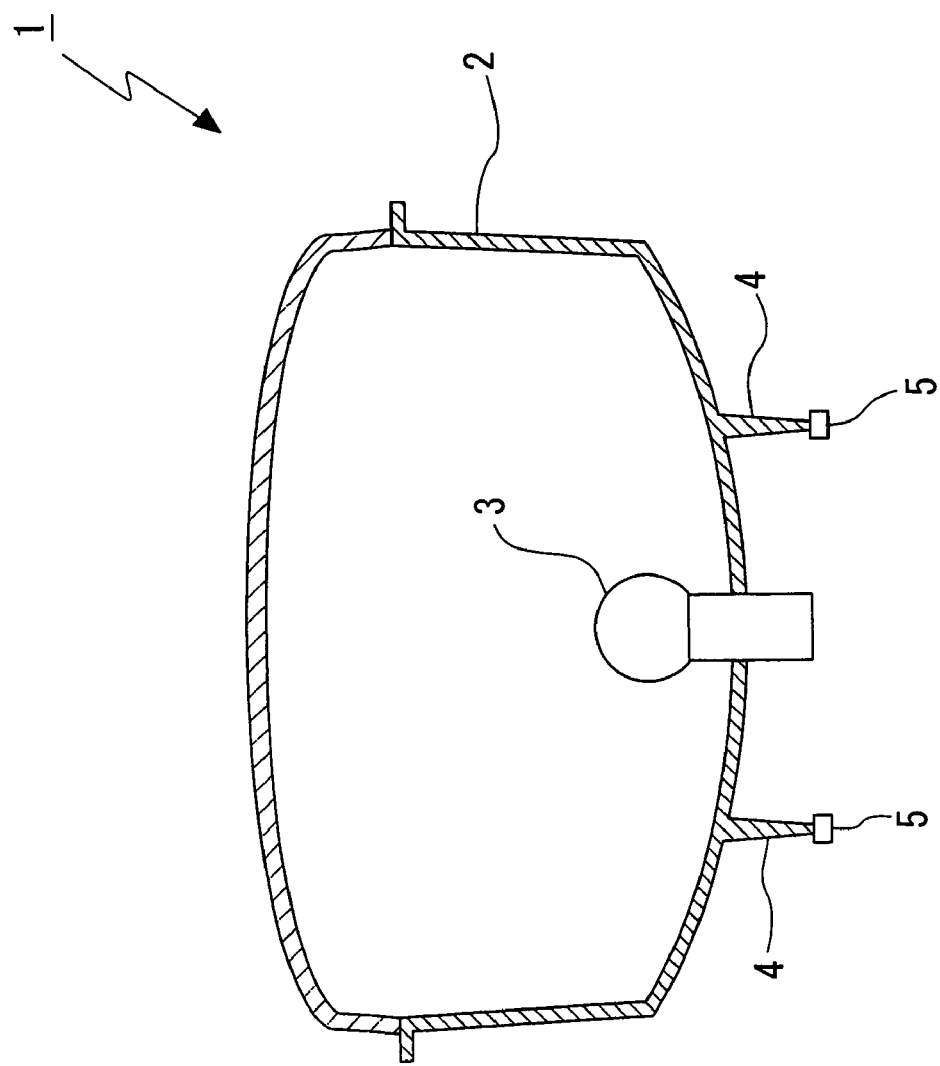
FIG. 5 is a schematic longitudinal sectional view of a related art vehicular lamp.
Figure 6:
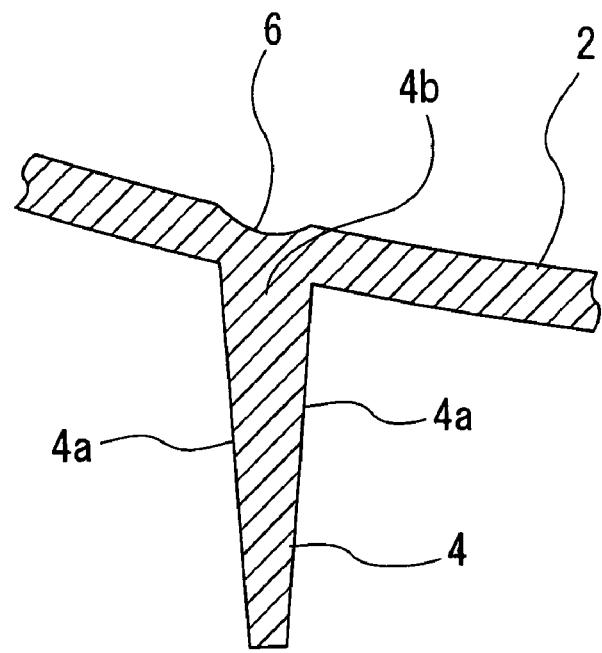
FIG. 6 is an enlarged sectional view of a main portion, which shows a problematic point in a related art vehicular lamp part.
Figure 7:
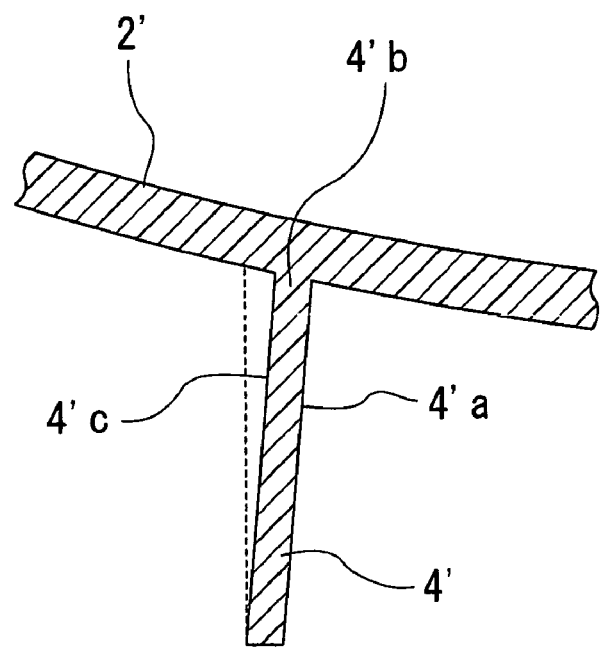
FIG. 7 is an enlarged sectional view of a main portion, which shows an example of means for solving the problematic point shown in FIG. 6.

At least one or more of the foregoing protruding pins 41, 41, . . . is formed in a two level extrusion construction (see FIGS. 8a and 8b), and is further moved, from the state shown in FIG. 3, in the die closing direction relative to the movable die 30. As a result, the lamp body 2' moves in the die closing direction relative to the push-up block 32 (FIG. 4). With this further movement of the lamp body 2', the undercut portion 4'c of the lamp body 2' moves in the die closing direction relative to the push-up block 32 while pushing the die surface 32b of the push-up block 32 in direction P that intersects with the die closing direction. As a result, the contact surfaces 44a, 45a of the positioning block 43 move away from the restricting surfaces 46a, 46b of the restricting concave portion 46, and the push-up pin 42 tilts such that the push-up block 32 moves in the direction of arrow P and the die surface 32b thereof is freed from the undercut portion 4'c of the lamp body 2' (see FIG. 4). As a result, the lamp body 2' is ejected from the movable die.

In the molding apparatus 10 described above, the push-up block 32, which has the die surface 32b corresponding to the undercut portion 4'c, is pushed by the slanted surface of the undercut portion 4'c by the movement of the lamp body 2' and moved in a direction that frees it from the undercut portion 4'c. As a result, there is no need to provide a mechanism on the movable die 30 for moving the push-up block 32 in a direction that frees it from the undercut portion 4'c, thereby enabling the die structure to be simplified.

Figure 8A:
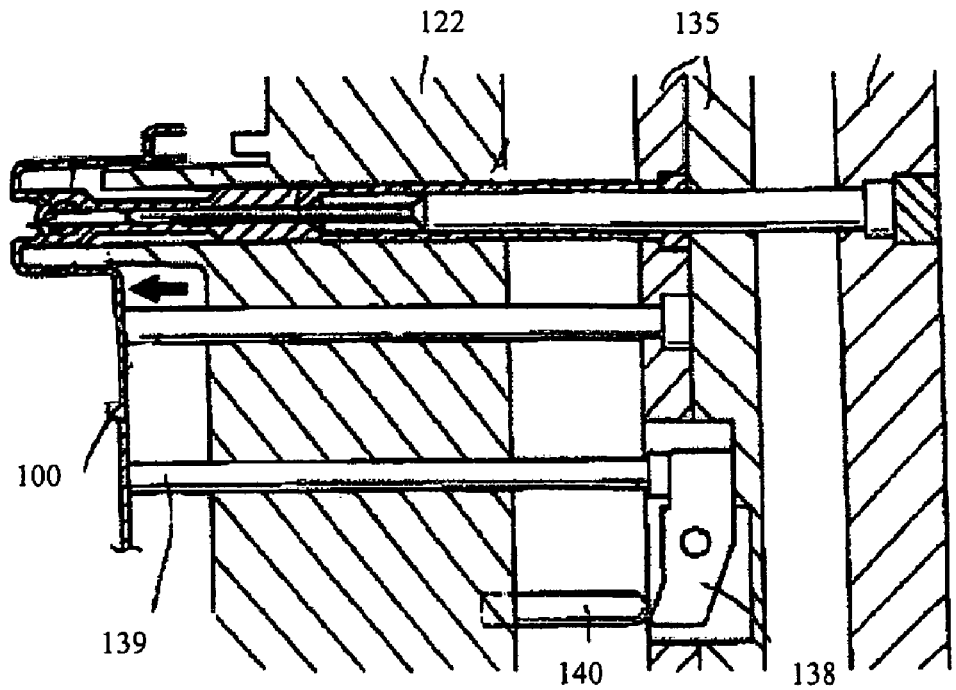
FIGS. 8a and 8b are detailed views of a related art exemplary embodiment of a two-level extrusion construction of a protruding pin.
Figure 8B:
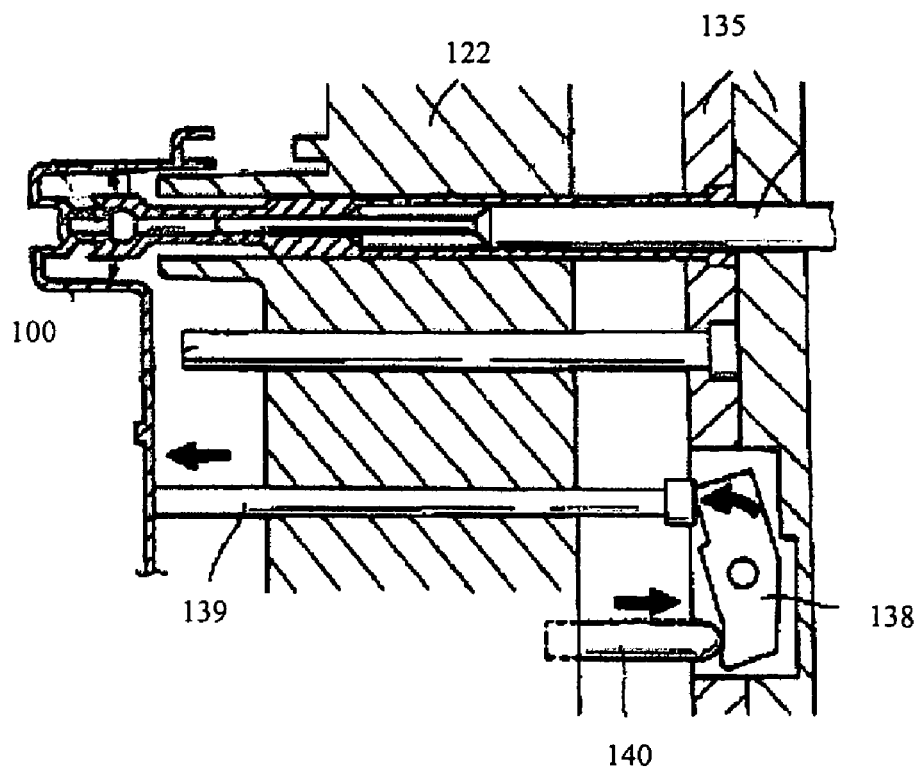

An exemplary embodiment of the above-mentioned two level extrusion construction of the protruding pin 41 is shown in FIGS. 8a and 8b (which are taken from Japanese Patent Hei. 07-246641). FIG. 8a shows a configuration where a molded part 100 is held above a mold half 122 by protruding pin 139 at a first level, and then FIG. 8b shows that, when plate 135 moves to the left, pin 140 pushes lever 138, which in turn pushes up on protruding pin 139 so that the molded part 100 is lifted to a second level.

Further, the embodiment described above illustrates an apparatus and method for molding a lamp body 2', but this does not mean that the vehicular lamp part molded by the invention is limited to a lamp body. The invention can of course also be applied to the molding of another vehicular lamp part such as a lens, extension, or the like, for example. Further, the invention can be applied to any injection molded part having an undercut configuration similar to that described herein.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A molding method for molding a vehicular lamp part having an undercut portion that has a surface that slants with respect to a die closing/opening direction of a movable die, comprising:

molding the vehicular lamp part in a molding apparatus comprising: a fixed die which closes together with the movable die to define a cavity; an extrusion plate positioned on a first side of the fixed die, with the movable die disposed therebetween, and which is movable in the die closing/opening direction; a separate push-up block, forming a portion of the cavity defined by the movable die corresponding to the undercut portion; a push-up pin comprising a first end fixed to the push-up block, a second end turnably held by the extrusion plate, and a middle part inserted into an insertion hole formed in the movable die; and the movable die comprising a gap formed between the insertion hole and the push-up pin that enables the push-up pin to tilt, releasing the vehicular lamp part from the movable die via the push-up block by relative movement between the extrusion plate and the movable die; and freeing the push-up block from the undercut portion by tilting the push-up pin with respect to the extrusion plate via further movement of the vehicular lamp part so that the slanted surface of the undercut portion pushes a die surface of the push-up block in a direction which intersects with the die closing/opening direction;

the molding apparatus further comprises a positioning block, fixed to the second end of the push-up pin, comprising contact surfaces continuously extending at angles on the top and bottom thereof, wherein the push-up block is held in a die closed position by contact between a first surface, of the contact surfaces, and a restricting surface formed on the extrusion plate, and wherein, the push-up block is freed from the undercut portion via the movement of the first surface away from the restricting surface of the extrusion plate.

2. The molding method according to claim 1, wherein:

a plurality of protruding pins are held by the extrusion plate, and at least one or more of these protruding pins has a two level extrusion construction, the vehicular lamp part is released together with the push-up block from the movable die by extrusion of the first level of the protruding pin, and the further movement of the vehicular lamp part occurs by extrusion of the second level of the protruding pin of the two level extrusion construction.

3. A molding apparatus for molding a vehicular lamp part having an undercut portion that has a surface that slants with respect to a die closing/opening direction of a movable die, comprising:

a fixed die which closes together with the movable die to define a cavity;

an extrusion plate positioned on a first side of the fixed die, with the movable die disposed therebetween, and which is movable in the die closing/opening direction;

a separate push-up block, forming a portion of the cavity defined by the movable die corresponding to the undercut portion;

a push-up pin comprising a first end integrally to the push-up block, a second end turnably held by the extrusion plate, and a middle part inserted into an insert ion hole formed in the movable die; and the movable die comprising a gap formed between the insertion hole and the push-up pin that enables the push-up pin to tilt, wherein, the movable die is movable in the die closing/opening direction, and the extrusion plate is movable in the die closing/opening direction relative to the movable die to release the vehicular lamp part from the movable die, and wherein, the push-up pin is tilted, after the release of the vehicular lamp part from the movable die and its corresponding movement further in the release direction, when the slanted surface of the undercut portion pushes the die surface of the push-up block in a direction that intersects with the die closing/opening direction, thereby freeing the push-up block from the undercut portion;

further comprising a positioning block, fixed to the second end of the push-up pin, comprising contact surfaces continuously extending at angles on the top and bottom thereof, wherein the push-up block is held in a die closed position by contact between a first surface of the contact surfaces and a restricting surface formed on the extrusion plate, and wherein the push-up is freed from the undercut portion via the movement of the first surface away from the restricting surface of the extrusion plate.

4. The molding apparatus according to claim 3, wherein:

a plurality of protruding pins are held by the extrusion plate, and at least one or more of these protruding pins has a two level extrusion construction, the vehicular lamp part is released together with the push-up block from the movable die by extrusion of the first level of the protruding pin, and the further movement of the vehicular lamp part occurs by extrusion of the second level of the protruding pin of the two level extrusion construction.

5. A molding method, comprising:

molding a component in a molding cavity defined by a fixed die, a movable die, and a push-up block, the component comprising an undercut portion at least partially defined by the push-up block to have a surface that slants with respect to a die opening/closing direction;

opening the molding cavity by moving the movable die in the die opening/closing direction;

moving an extrusion plate relative to the movable die so that a push-up pin, movably mounted on the extrusion plate and fixed to the push-up block, separates the push-up block from the movable die, thereby separating the component from the movable die; and tilting the push-up pin to separate the push-up block from the component;

wherein the push-up pin is tiltably mounted on the extrusion plate via a positioning block provided within a concave portion of the extrusion plate.

6. The molding method according to claim 5, wherein the tilting of the push-up pin is caused by pressure exerted on the push-up block by the undercut portion of the component in the direction of the tilting.

7. The molding method according to claim 5, wherein the positioning block comprises an upper surface with at least two differently angled surfaces that individually interact with the concave portion to define the range of the tilting of the push-up pin.

8. A molding apparatus, comprising:
a fixed die, a movable die, and a push-up block defining a molding cavity to form a component, the component comprising an undercut portion at least partially defined by the push-up block to have a surface that slants with respect to a die opening/closing direction;
an extrusion plate, movable with respect to the movable die in the die opening/closing direction; and
a push-up pin movably mounted on the extrusion plate and fixed to the push-up block, the movable die having an insertion hole through which the push-up pin extends, the insertion hole having a diameter larger than the push-up pin to allow the push-up to tilt so that the component can be separated from the push-up block;
wherein the push-up pin is tiltably mounted on the extrusion plate via a positioning block provided within a concave portion of the extrusion plate.

9. The molding apparatus according to claim 8, wherein the tilting of the push-up pin is caused by pressure exerted on the push-up block by the undercut portion of the component in the direction of the tilting.

10. The molding apparatus according to claim 8, wherein the positioning block comprises an upper surface with at least two differently angled surfaces that individually interact with the concave portion to define the range of the tilting of the push-up pin.

* * * * *